United States Patent
Kagohara et al.

(10) Patent No.: US 7,771,120 B2
(45) Date of Patent: Aug. 10, 2010

(54) PLAIN BEARING FOR INTERNAL COMBUSTION ENGINES

(75) Inventors: Yukihiko Kagohara, Inuyama (JP);
Hideo Ishikawa, Inuyama (JP);
Masaaki Sakamoto, Inuyama (JP);
Hidemi Ogihara, Wako (JP)

(73) Assignee: Daido Metal Corporation, Ltd., Nagoya (JP)

( * ) Notice: Subject to any disclaimer, the term of this patent is extended or adjusted under 35 U.S.C. 154(b) by 1038 days.

(21) Appl. No.: 11/059,521

(22) Filed: Feb. 17, 2005

(65) Prior Publication Data

US 2005/0180669 A1 Aug. 18, 2005

(30) Foreign Application Priority Data

Feb. 18, 2004 (JP) .............................. 2004-041516

(51) Int. Cl.
*F16C 9/02* (2006.01)
*F16C 33/02* (2006.01)
(52) U.S. Cl. ........................................ 384/294; 384/276
(58) Field of Classification Search ................. 384/912, 384/913, 907, 276, 294
See application file for complete search history.

(56) References Cited

U.S. PATENT DOCUMENTS

| 4,121,928 | A | | 10/1978 | Mori | |
|---|---|---|---|---|---|
| 4,193,645 | A | * | 3/1980 | Baker et al. | 384/297 |
| 5,362,574 | A | * | 11/1994 | Tanaka et al. | 428/643 |
| 5,384,205 | A | * | 1/1995 | Tanaka et al. | 428/643 |
| 5,925,471 | A | * | 7/1999 | Eastham et al. | 428/650 |
| 2003/0185474 | A1 | * | 10/2003 | Tanaka et al. | 384/297 |

FOREIGN PATENT DOCUMENTS

| DE | 26 31 907 A1 | | 2/1977 |
|---|---|---|---|
| EP | 1 338 679 A1 | | 8/2003 |
| GB | 2381 007 A | | 4/2003 |
| JP | 361012844 A | * | 1/1986 |
| JP | 411209836 A | * | 8/1999 |
| JP | 2003-090343 | | 3/2003 |
| WO | WO 02/40743 A1 | | 5/2002 |

* cited by examiner

*Primary Examiner*—Thomas R Hannon
*Assistant Examiner*—Justin Krause
(74) *Attorney, Agent, or Firm*—Browdy and Neimark, PLLC

(57) ABSTRACT

Disclosed is a plain bearing for internal combustion engines, in which a back metal layer is lined with a bearing alloy layer made of an aluminum-base bearing alloy which has a Vickers hardness (Hv) of from not less than 40 to not more than 160. The bearing alloy layer includes a lubricative surface layer which has a thickness of not more than 10 μm and contains a solid lubricant. The maximum concentration of an element contained in the solid lubricant is not less than 5 mass %.

9 Claims, 4 Drawing Sheets

FIG.3
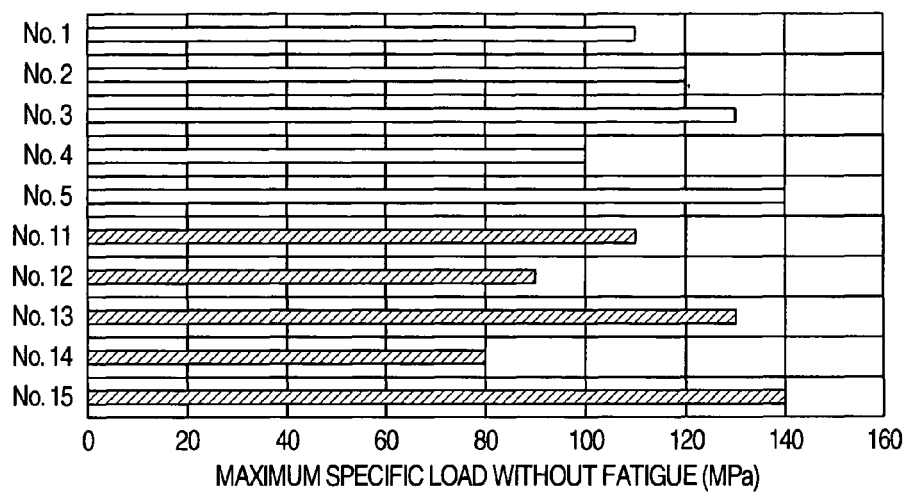
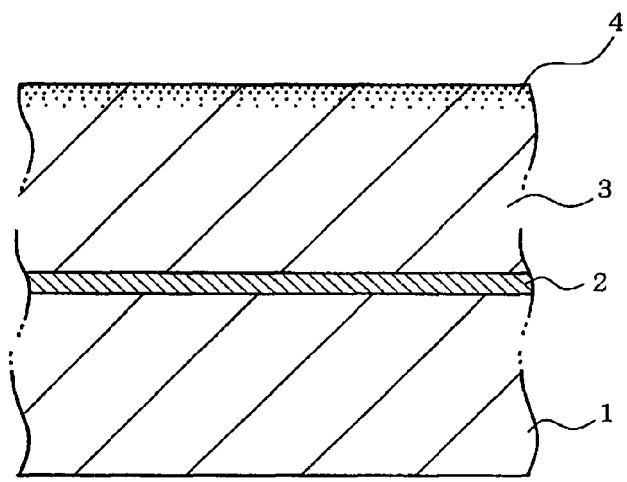
FIG.4
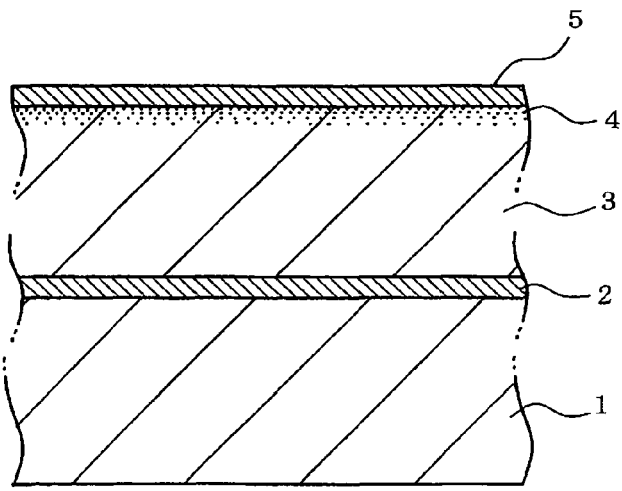
FIG.5

PLAIN BEARING FOR INTERNAL COMBUSTION ENGINES

BACKGROUND OF THE INVENTION

The present invention relates to a plain bearing for internal combustion engines, in which a back metal layer is lined with an aluminum-base bearing alloy layer, and more particularly to the plain bearing of which coefficient of friction is reduced while maintaining good fatigue resistance property and which is improved in anti-seizure property.

Plain bearings with an aluminum-base bearing alloy are excellent in anti-seizure property, fatigue resistance and wear resistance, and widely used in internal combustion engines for automobiles and general industrial machinery.

Such aluminum-base bearing alloys used in plain bearings for internal combustion engines contain additives such as Sn, Cu and Si for the improvement of their bearing properties. Sn is a soft metal, which contributes to ensuring conformability by virtue of its deformability. Cu strengthens the Al matrix and improves fatigue resistance property. Si serving as hard particles laps a surface of a mating shaft supported by the plain bearing thereby ensuring an lubricant oil film between an inner surface of the plain bearing and the mating shaft to improve anti-seizure property.

While internal combustion engines today have been so designed to meet requirements for ever higher speed, higher power output, lighter weight and lower fuel consumption, the plain bearings are desired to have further improved performance. Thus, such high speed and high power internal combustion engines bring a thinner lubricant oil film in the plain bearing and pose a problem of a susceptible shape change of a lightened bearing housing. As a result, the oil film becomes extremely thinner to increase metal-to-metal contact portions resulting in a possibility of abnormal wear or seizure due to adhesion. In order to avoid such disadvantages, plain bearings are required to have properties of conformability, high seizure resistance and good fatigue resistance, wherein the good conformability is for forming an oil film at a running-in stage of operation, the high seizure resistance is of a countermeasure against a metal-to-metal contact, and the good fatigue-resistance is for preventing occurrence of fatigue at an early stage of operation.

On the other hand, as one way for lower fuel consumption, a lubricant oil having a low viscosity is used in plain bearings in order to reduce shearing resistance of the lubricant oil resulting in that the oil film becomes thinner thereby increasing metal-to-metal contact portions. In such metal-to-metal contact portions, the frictional resistance between a mating shaft and a plain bearing is high, so that the plain bearings might not contribute to lower fuel consumption and friction heat is generated. Because of the friction heat, the viscosity of the lubricant oil may drop to promote the metal-to-metal contact. In order to prevent such heat generation, it is required to make the coefficient of friction of the plain bearing lower with relation to the mating shaft. If the coefficient of friction can be made lower, it is possible not only to reduce heat generation but also to improve anti-seizure and fatigue resistance properties.

PCT WO 02/040743 A1, which does not relate to a plain bearing, discloses to provide a piston in an internal combustion engine with a surface layer containing $MoS_2$ by shooting a fine powder of molybdenum disulfide ($MoS_2$), as a solid lubricant, to collide against the piston so as to penetrate into the surface layer of the piston within a depth of not more than 20 µm.

It has been well known to reduce the friction resistance of a plain bearing with relation to a mating shaft by adding a solid lubricant in a bearing alloy, or by coating the surface of the bearing alloy with a solid lubricant with utilization of a binder resin.

However, in the case of coating, there are problems of inferior bonding strength thereof and a possibility of an insufficient friction reducing effect of the solid lubricant due to the presence of the binder resin. In the case of the bearing alloy containing the solid lubricant, when an aluminum-base bearing alloy, for example, is produced by the powder metallurgical method, a blend of an aluminum-base bearing alloy powder and a solid lubricant powder is sintered to obtain a bearing which is not durable in actual use in internal combustion engines because of an inferior powder bonding problem resulting in lack of alloy strength.

Accordingly, there might be an idea of applying the technique shown in PCT WO 02/040743 A1 to a plain bearing used in internal combustion engines to provide it with a surface layer containing $MoS_2$. According to the publication, a fine powder of molybdenum disulfide ($MoS_2$) is shot to a piston to form a surface layer containing $MoS_2$ and having a thickness of not more than 20 µm, and to simultaneously provide the surface of the piston with fine dimples, whereby realizing reduction of friction by virtue of the lubrication effect of $MoS_2$ itself and an oil reservoir effect of the dimples on the surface.

The publication teaches further that, when the fine powder of molybdenum disulfide ($MoS_2$) is shot at a high speed to collide against the piston, the surface temperature of the piston rises up to such a high level that the surface layer of the piston is melted partially to form an intermetallic compound derived from alloy components and Mo in $MoS_2$, whereby the anchoring strength of $MoS_2$ is increased, and the surface is work-hardened to have improved wear resistance property.

However, it should be noted that the piston is made of a hard metal having a Vickers hardness of not less than 300 whereas the aluminum-base bearing alloy is soft not like as the piston. From this difference between the aluminum-base bearing alloy and the piston, according to an experiment conducted by the present inventors, when a fine powder of a solid lubricant is shot to collide against the aluminum-base bearing alloy, a surface roughness of the alloy increases, and large dimples each having an irregular shape are formed in the surface of the alloy resulting in occurrence of breaking of an lubricant oil film due to such dimples while overriding the oil reservoir effect by the dimples, whereby occurring heat generation due to an excessive metal-to-metal contact resulting in deteriorated anti-seizure and fatigue resistance properties.

BRIEF SUMMARY OF THE INVENTION

In view of the above technical background, an object of the present invention resides in providing a plain bearing for internal combustion engines, which is provided with a lubricative surface layer containing a solid lubricant while avoiding formation of a roughened surface, whereby realizing a low coefficient of friction of the plain bearing while maintaining good fatigue resistance property thereby attaining excellent anti-seizure property.

According to the invention, there is provided a plain bearing for internal combustion engines, comprising a back metal layer and a bearing alloy layer made of an aluminum-base bearing alloy formed on the back metal layer, wherein the bearing alloy layer has a Vickers hardness (Hv) of from not less than 40 to not more than 160 and comprises a lubricative surface layer, also referred to herein as a lubricative surfacial sub-layer, which has a thickness of not more than 10 µm and contains a solid lubricant, and wherein the maximum concentration of an element contained in the solid lubricant is not less than 5 mass %.

An oil film formed between the plain bearing and a mating shaft in an internal combustion engine is liable to become thinner due to a misalignment, for example, during a running-in stage of operation of the engine, and due to a high speed or an abrupt speed change during a normal operation of the engine. Under such conditions, the surface of the plain bearing is in direct contact with the mating shaft (i.e. a metal-to-metal contact), whereby it suffers an appropriate extent of deformation and wear. Such deformation and wear allow the surface of the plain bearing to keep a lubricant oil film through which the surface suffers an oil film pressure during operation of the internal combustion engine, whereby a normal operation of the internal combustion engine is ensured.

If the plain bearing is brought into metal-to-metal contact with the mating shaft, the friction resistance therebetween increases higher than that in the state when the oil film is formed, which state is of a fluid lubrication state. In the metal-to-metal contact state, there arises heat generation to lead to deteriorated strength of the bearing alloy and an increase of adhesion of the bearing alloy to the mating shaft, whereby occurring seizure or fatigue.

In the invention plain bearing, the bearing alloy layer has a lubricative surface layer containing a solid lubricant. The solid lubricant is self-lubricative and has a low coefficient of friction. Therefore, according to the invention plain bearing, even if there arises a metal-to-metal contact between the plain bearing and the mating shaft, an increase of the frictional resistance therebetween can be prevented by the presence of the lubricative surface layer. Thus, a heat generation at the metal-to-metal contact portions is well reduced resulting in that the bearing alloy layer is prevented from deterioration in strength and advantageous also in the view point point of anti-seizure and fatigue-resistance properties.

As stated above, it is preferable for the surface layer of the bearing alloy to moderately wear to form a lubricant oil film. In order to obtain the solid lubricant effect taking account of a total wear of the plain bearing until the life duration of the internal combustion engine expires, preferably the lubricative surfacial sub-layer containing the solid lubricant has a thickness of about 10 µm from the surface of the bearing alloy layer. If the thickness exceeds 10 µm, the bearing alloy layer is deteriorated in strength leading to fatigue under the oil film pressure. A more preferable thickness of the lubricative surfacial sub-layer is not more than 5 µm.

With regard to an amount of a component element contained in the solid lubricant, it is possible to obtain the effect of reducing the coefficient of friction by setting the amount to be not less than 5 mass % in a depth section of the lubricative surface layer, which depth section has a maximum concentration of the element (i.e. not less than 5 mass %). In the case where a plural types of solid lubricant are contained in the lubricative surface layer, the above amount means a total amount of the pertinent elements contained in all the solid lubricants. Preferably, the amount of the element(s) is not less than 15 mass %. In this regard, the element contained in the solid lubricant is so defined that, in the case where the solid lubricant consists of a single element, this is the pertinent element, and in the case where the solid lubricant contains two or more elements, an element having the greatest atomic weight in the two or more elements is the pertinent element. FIGS. 6 to 8 schematically show three types of concentration distribution of the above element in the bearing alloy layer, where the axes of abscissa and ordinate represent the element concentration and the depth from the surface, respectively. The concentration of the element contained in the solid lubricant within the lubricative surface layer may either vary in proportion to the depth from the surface of the bearing alloy (toward the back metal layer) as shown in FIG. 6 and FIG. 7, or be constant over the whole depth with no concentration variation as shown in FIG. 8.

In the case where the element concentration varies in proportion to the depth from the surface of the bearing alloy layer, the concentration may be at its maximum either on the surface as shown in FIG. 6 with a gradual fall in proportion to the depth, or at a depth slightly below the surface as shown in FIG. 7, with the concentration rising from the surface to the maximum concentration portion and gradually falling in proportion to the depth. In the case where the element concentration is constant over the whole depth with no variation as shown in FIG. 8, the maximum concentration portion is the whole lubricative surface layer.

In the case where the element concentration in the lubricative surfacial sub-layer varies from the maximum concentration portion at the surface toward a deeper portion in proportion to the depth, it is possible to obtain the effect of reducing the coefficient of friction on the surface of the lubricative surfacial sub-layer containing the solid lubricant and a further effect of keeping fatigue resistance while maintaining the strength of the aluminum-base bearing alloy in the deeper portion.

The invention aluminum-base bearing alloy may contain additives of not more than 30 mass % Sn and not more than 15 mass % Si.

While Sn enhances conformability, if it exceeds 30 mass %, the bearing alloy can not have proper mechanical properties. While Si ensures forming of an oil film on the surface of the bearing alloy thereby improving the anti-seizure property, if it exceeds 15 mass %, plastic working of the bearing alloy becomes hard.

Regarding another alloying element(s), the following elements may be added to the bearing alloy in order to strengthen the Al matrix thereby improving the fatigue-resistance property, which element(s) is of at least one element selected from the group consisting of Cu, Zn and Mg in a total amount of 0.1 to 6 mass % and/or at least one element selected from the group consisting of Mn, V, Mo, Cr, Ni, Co and W in a total amount of 0.01 to 3 mass %.

In order to add the solid lubricant into the bearing alloy layer, it will be able to apply the known technique as shown in PCT WO 02/040743 A1 into the bearing alloy, according to which idea, a fine powder of the solid lubricant is shot to collide against the surface of the bearing alloy layer. In such a shot blast technique, it will possible to use one or more substances selected from the group consisting of molybdenum disulfide, graphite, tungsten disulfide, boron nitride, graphite fluoride and molybdenum trioxide. The particle size of the solid lubricant is preferably 0.5 to 10 µm.

In the invention, the hardness of the bearing alloy layer is set to have a Vickers hardness (Hv) of from not less than 40 to not more than 160. In the case where the bearing alloy layer has a Vickers hardness (Hv) of more than 160, higher energy concerning a collision velocity of shot particles and a powder mass will be required in order to cause the solid lubricant to enter into the bearing alloy layer, possibly resulting in occurrence of dimples on the surface of the bearing alloy layer or a rough surface of the same due to locally melting of the surface. If the bearing alloy layer has a Vickers hardness (Hv) of less than 40, it will not be durable for bearings used in internal combustion engines under a high load, and might result in occurrence of fatigue.

As stated above, according to the shot blast method with a fine powder of the solid lubricant, there might occur dimples on the surface of the bearing alloy layer depending upon powder shooting conditions, whereby the surface is coarsened. Preferably the surface roughness is a maximum height (Rz) of not more than 5 μm from the viewpoints of preventing the oil film from breaking and of keeping properly the coefficient of friction, and anti-seizure and fatigue-resistance properties. More preferably, the surface roughness is not more than 3 μm.

The aluminum-base bearing alloy of the bearing alloy layer may contain 3 to 20 mass % Sn, which has a Vickers hardness (Hv) of from not less than 40 to not more than 80.

Sn improves characteristics required to the plain bearing, which characteristics include conformability, anti-seizure property and embeddability. Taking such characteristics and mechanical properties of the bearing alloy into concentration, preferably the Sn amount is 3 to 20 mass %, more preferably 6 to 15 mass %.

Further, taking plastic workability including rolling, preferably the aluminum-base bearing alloy has a Vickers hardness (Hv) of not more than 80, more preferably 40 to 60.

The aluminum-base bearing alloy of the bearing alloy layer may contain 4 to 12 mass % Si, which has a Vickers hardness (Hv) of from not less than 80 to not more than 160.

Si dissolves in the Al matrix, and crystallizes as Si particles having high hardness, whereby improving the alloy hardness. The crystallized Si particles lap the surface of the mating shaft to reduce the surface roughness thereof, thereby facilitating formation of an oil film on the surface of the mating shaft. In the case where the bearing alloy has a Vickers hardness (Hv) exceeding 80, the lapping effect on the mating shaft is important. In order to obtain good lapping effect and plastic workability, preferably the Si amount is 4 to 12 mass %, more preferably 5 to 10 mass %.

If the Vickers hardness exceeds 160, the aluminum-base bearing alloy is significantly deteriorated in conformability. A more preferable Vickers hardness is 80 to 120.

The aluminum-base bearing alloy of the bearing alloy layer may contain 3 to 20 mass % Sn and 1.5 to 8 mass % Si, which has a Vickers hardness (Hv) of from not less than 40 to not more than 80.

In the aluminum-base bearing alloy, if the Si amount is less than 1.5 mass %, the lapping effect is deteriorated. If the Si amount exceeds 8 mass %, the aluminum-base bearing alloy is deteriorated in plastic workability because of the presence of soft Sn. Preferably the Sn amount is 6 to 15 mass % and the Si amount is 2 to 5 mass %.

In the present invention, it is possible to provide a coating layer on the surface of the bearing alloy layer, which coating consists of a solid lubricant and has a thickness of 0.01 to 10 μm. While such a coating can be formed by shooting the solid lubricant against the bearing alloy layer, if shooting energy of the solid lubricant is lower, the solid lubricant adheres to the surface of the bearing alloy layer to form a solid lubricant layer so as to combine the bearing alloy by virtue of intermolecular force while the solid lubricant does not enter into the bearing alloy layer.

Since the coating layer consists of only the solid lubricant, the self-lubricating property of the bearing can be further improved. In the case where the coating layer has a thickness of less than 0.01 μm, it is possible to obtain substantially the same effect as the case that the surface layer of the aluminum-base bearing alloy, within a depth of 10 μm from the surface, contains not less than 5 mass % of an element(s) contained in the solid lubricant. If the coating layer has a thickness exceeding 10 μm, it is liable to be exfoliated from the bearing alloy layer. The thickness is preferably 0.1 to 5 μm. FIG. 9 shows one example of the concentration variation of the element contained in the solid lubricant which includes the coating layer and that (i.e. the solid lubricant) existing in the lubricative surface layer of the bearing alloy layer.

BRIEF DESCRIPTION OF THE SEVERAL VIEWS OF THE DRAWINGS

FIG. 3 is a graph showing the result of a fatigue test;

FIG. 4 shows a section of one embodiment of the invention;

FIG. 5 shows a section of another embodiment of the invention;

DETAILED DESCRIPTION OF THE INVENTION

Figure 1:
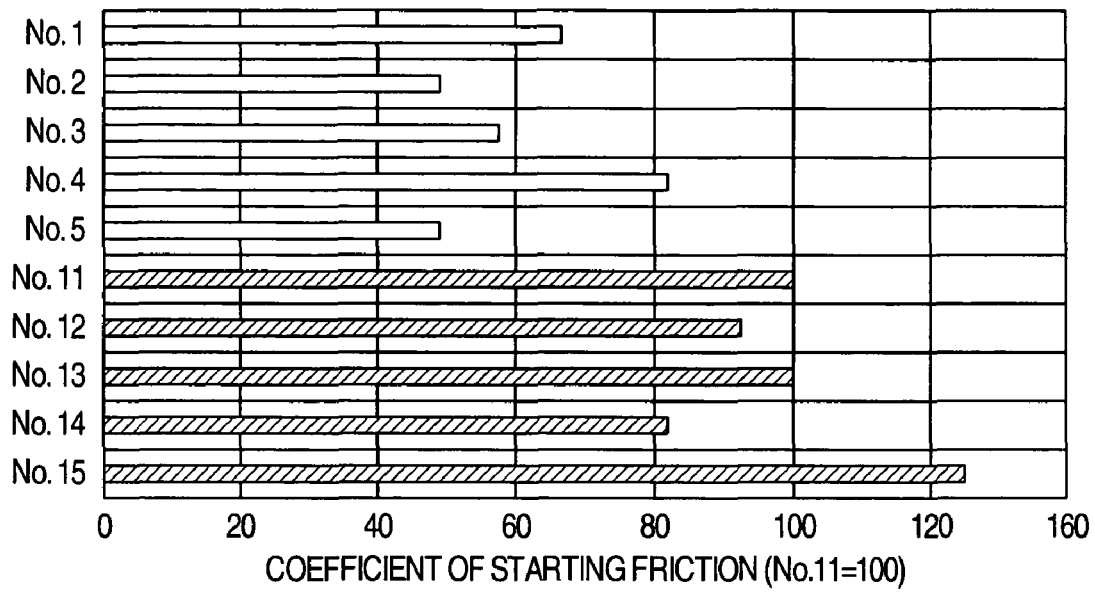
FIG. 1 is a graph showing the measurement result of the coefficient of starting friction.

Herein below there will be provided details of specific embodiments of the present invention.

First, a method of producing the invention plain bearing will be described. An aluminum-base bearing alloy plate as the bearing alloy layer is produced through the usual process of casting and rolling. An aluminum alloy plate used as a bonding layer is superimposed on the above aluminum-base bearing alloy plate and they are subjected to a roll-bonding process to produce a bi-layered aluminum alloy plate. The bi-layered aluminum alloy plate is superimposed on a low carbon steel strip serving as a back metal layer such that the aluminum alloy plate as a bonding layer faces to the strip, and subsequently they are subjected to a roll-bonding process to produce a bimetal in which the aluminum-base bearing alloy plate is bonded to the low-carbon steel strip via the aluminum alloy plate as a bonding layer.

The bimetal is subjected to annealing and subsequently to a process of fabricating a plain bearing having a semi-cylindrical form. Thereafter, a fine powder of the solid lubricant having a particle size of 0.5 to 10 μm is shot against the inner surface of the plain bearing with utilization of compressed air having a pressure of 0.5 to 1.0 MPa to provide a lubricative surface layer to the bearing alloy layer.

The thus formed plain bearing has a sectional structure as shown in FIG. 4, wherein reference numeral 1 denotes a back metal layer, 2 a bonding layer, 3 a bearing alloy layer, and 4 a lubricative surface layer of the bearing alloy layer.

Alternatively, a coating layer 5 consisting of a solid lubricant may be formed on the surface of the solid lubricant lubricative surface layer 4 (i.e. the surface of the bearing alloy 1 layer 3) as shown in FIG. 5.

Invention specimens and comparative specimens as shown in following Table 1 were prepared by the manufacturing process described above, and subjected to performance tests.

None of the specimens was provided with the coating layer. With regard to the respective specimen, the concentration of the element contained in the solid lubricant in the lubricative surface layer 4 was measured by the Glow Discharge Optical Emission Spectrometry (GDOES). The performance tests were a test for measuring a coefficient of starting friction, a seizure test and a fatigue test. The test conditions are shown in Tables 2 to 4, and the test results are shown in FIGS. 1 to 3.

A description of the tests will be provided below.

(1) Test for Measuring Coefficient of Starting Friction

Figure 2:
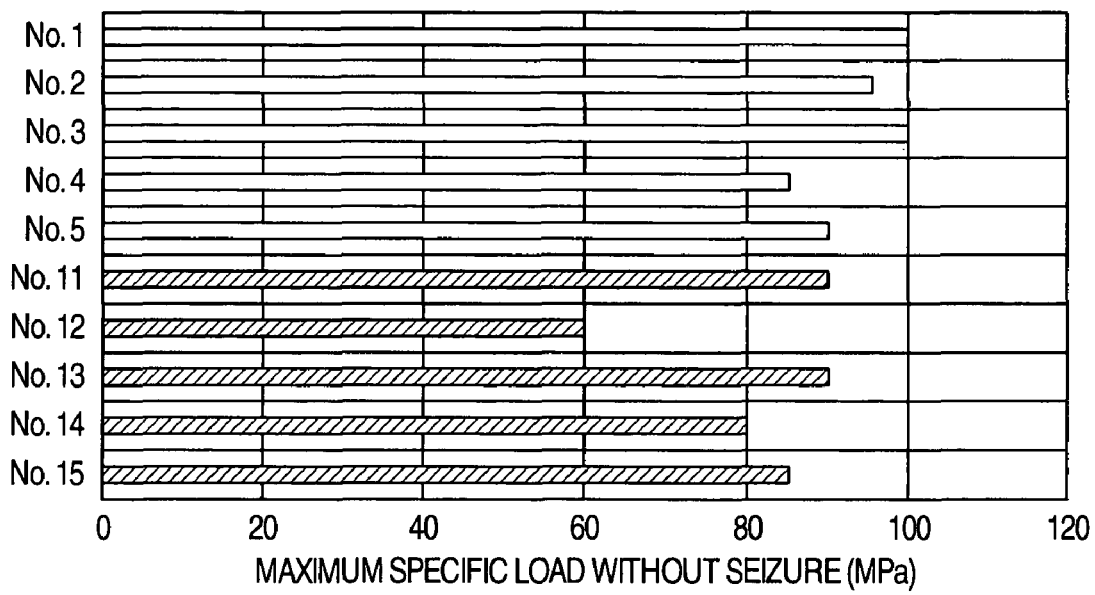
FIG. 2 is a graph showing the result of a seizure test.
Figure 6:
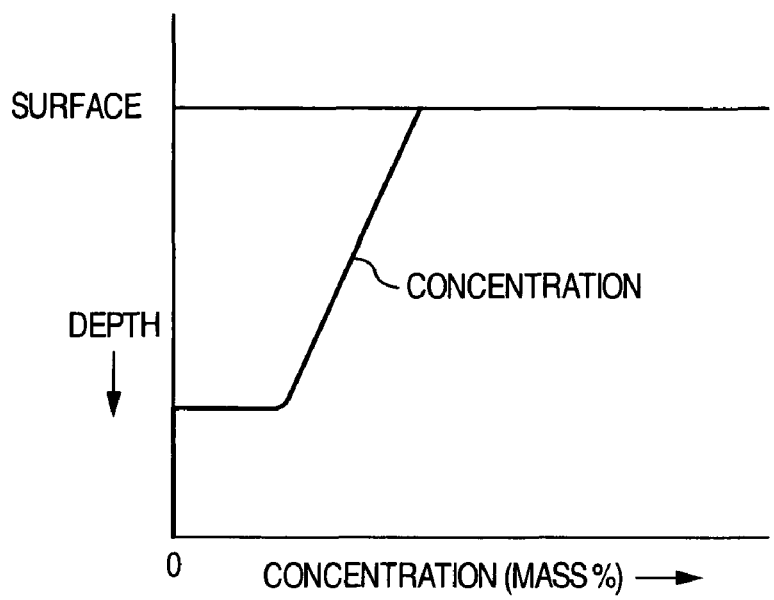
FIG. 6 shows a first distribution type of concentration of the element contained in the solid lubricant in the lubricative surface layer.
Figure 7:
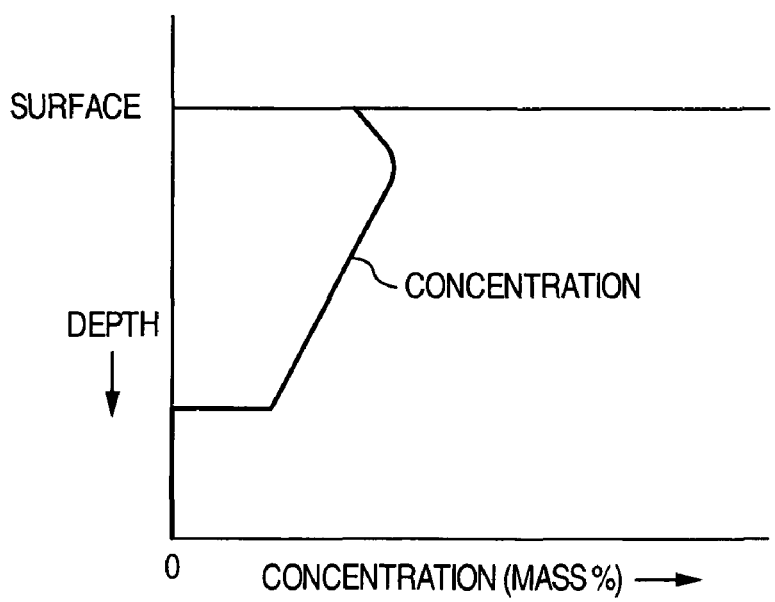
FIG. 7 shows a second distribution type of concentration of the element contained in the solid lubricant in the lubricative surface layer.
Figure 8:
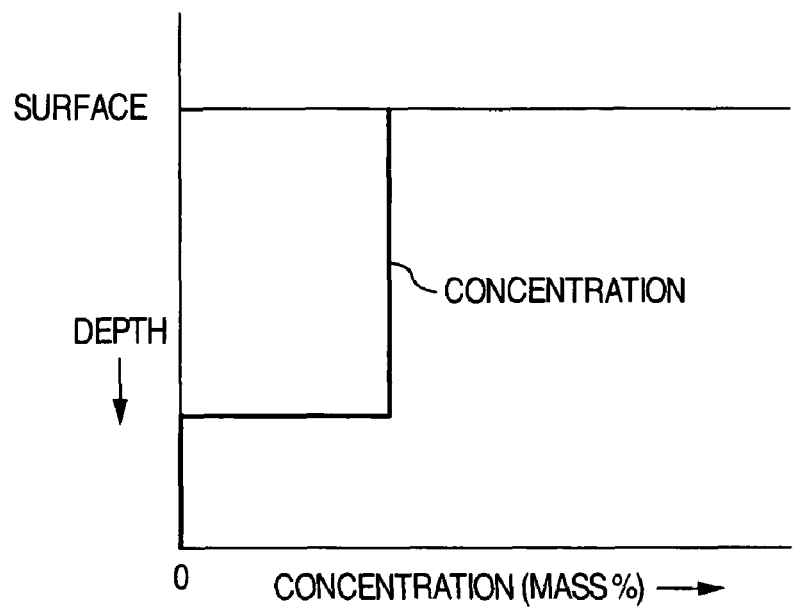
FIG. 8 shows a third distribution type of concentration of the element contained in the solid lubricant in the lubricative surface layer.
Figure 9:
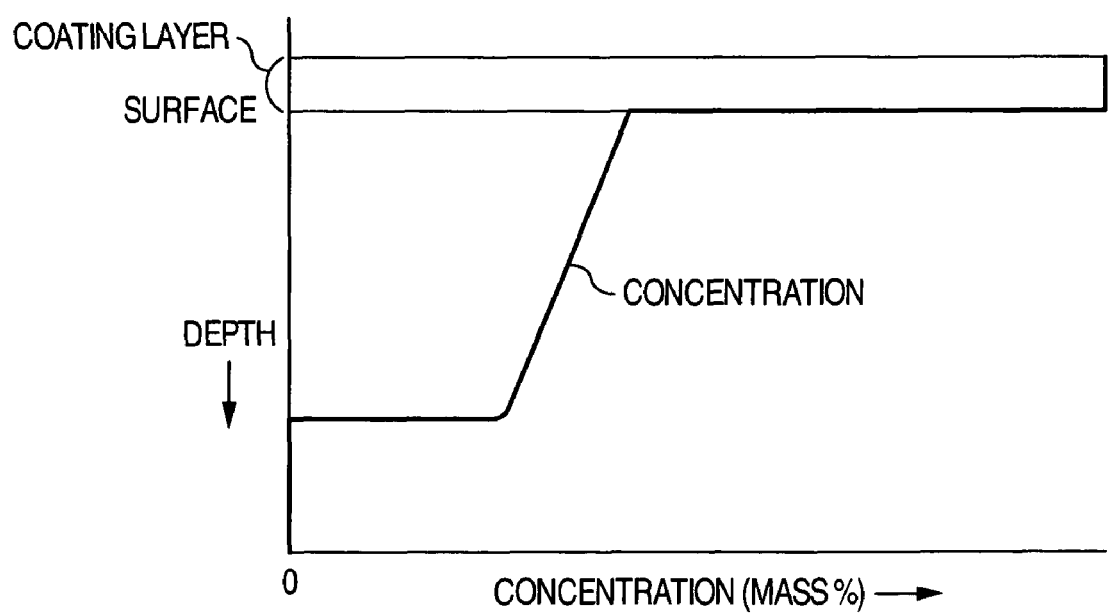
FIG. 9 shows a fourth distribution type of concentration of the element contained in the solid lubricant in the lubricative surface layer.

In this test, the coefficient of starting friction of Comparative Specimen No. 11 was regarded as a reference value of 100, and that of the respective specimen was determined relative thereto and shown in FIG. 1.

Comparing Invention Specimen Nos. 1 and 5 with Comparative Specimen Nos. 11 and 15, respectively, the former

TABLE 1

| | Specimen No. | Thickness (μm) | Maximum concentration of element contained in solid lubricant (mass %) | Type of solid lubricant | Surface roughness of bearing alloy layer (Rmax: μm) | Hardness of bearing alloy (Hv) | Composition of bearing alloy layer | | |
|---|---|---|---|---|---|---|---|---|---|
| | | | | | | | Sn (mass %) | Si (mass %) | Al |
| Invention Specimen | 1 | 1.79 | Mo: 15.2 | MoS$_2$ | 1.82 | 51 | 10 | 3 | Bal. |
| | 2 | 3.86 | Gr: 21.3 | Gr* | 3.24 | 65 | 12 | 2 | Bal. |
| | 3 | 6.50 | W: 31.2 | WS$_2$ | 4.33 | 98 | — | 5 | Bal. |
| | 4 | 0.94 | Mo: 7.8 | MoS$_2$ | 1.38 | 49 | 17 | — | Bal. |
| | 5 | 2.02 | Mo: 18.8 | MoS$_2$ | 2.27 | 150 | — | 8 | Bal. |
| Comparative Specimen | 11 | — | — | — | 1.90 | 51 | 10 | 3 | Bal. |
| | 12 | 12 | Mo: 45.0 | MoS$_2$ | 6.71 | 51 | 10 | 3 | Bal. |
| | 13 | 0.57 | W: 3.9 | WS$_2$ | 4.33 | 98 | — | 5 | Bal. |
| | 14 | 0.94 | Mo: 8.0 | MoS$_2$ | 1.27 | 36 | 40 | — | Bal. |
| | 15 | — | — | — | 2.41 | 151 | — | 8 | Bal. |

*Note = "Gr" means "graphite"

TABLE 2

| CONDITIONS | |
|---|---|
| Velocity | 1.0 m/sec. (1 cycle (start-stop) for 4 sec.) |
| Lubricant | VG22 |
| Oil flow | 2 cc/min. |
| Shaft material | JIC S55C |
| Evaluation method | Coefficient of starting friction is measured one hour later |
| Test specific load | 4 MPa |

TABLE 3

| CONDITIONS | |
|---|---|
| Velocity | 20 m/sec. |
| Test specific load | 10 MPa step up every 10 minutes |
| Lubricant | VG22 |
| Oil inlet temperature | 100° C. |
| Oil flow | 150 cc/min. |
| Shaft material | JIS S55C |
| Evaluation Method | Maximum specific load without seizure |

TABLE 4

| CONDITIONS | |
|---|---|
| Velocity | 9.0 m/sec. |
| Test duration | 20 hours |
| Lubricant | VG68 |
| Oil inlet temperature | 100° C. |
| Oil supply pressure | 0.49 MPa |
| Shaft material | JIS S55C |
| Evaluation method | Maximum specific load without fatigue |

Invention Specimens each containing not less than 5 mass % of the solid lubricant within a depth of 10 μm from the surface have a reduced coefficient of starting friction, respectively, by 27% to 50% as compared with the latter Comparative Specimens containing no solid lubricant.

Comparing Invention Specimen Nos. 1 to 5 with Comparative Specimen No. 12, the latter specimen having a surface roughness exceeding 5 μm has a higher coefficient of starting friction than the former Invention Specimens.

Further comparing Invention Specimen Nos. 1 to 5 with Comparative Specimen No. 13, the latter specimen, in which the solid lubricant contains the element having the maximum concentration of less than 5 mass %, has a higher coefficient of starting friction than the former Invention Specimen Nos. 1 to 5.

(2) Seizure Test

Comparing Invention Specimen No. 1 with Comparative Specimen No. 11, and Invention Specimen No. 5 with Comparative Specimen No. 15, respectively, as will be apparent from FIG. 2, both the Invention Specimen Nos. 1 and 5 each containing not less than 5 mass % of a solid lubricant within a depth of 10 μm from the surface of the bearing alloy layer have more improved anti-seizure property than the Comparative Specimen Nos. 11 and 15 containing no solid lubricant. Presumably this will be of a restraint effect of heat generation by virtue of the reduced coefficient of friction.

Comparing Invention Specimen Nos. 1 to 5 with Comparative Specimen No. 12, the latter specimen having a surface roughness exceeding 5 μm is inferior in anti-seizure property than the former Invention Specimen Nos. 1 to 5. Presumably this will be a result of increased heat generation due to the higher surface roughness.

Further comparing Invention Specimen No. 3 with Comparative Specimen No. 13, the former invention specimen exhibits higher anti-seizure property than the latter comparative specimen, in which the solid lubricant contains the element having the maximum concentration of less than 5 mass %. Presumably this will be a result of an exhibited restraint effect of heat generation by virtue of the solid lubricant contained in the Invention Specimen No. 3.

It is noted that all of the Invention Specimen Nos. 1 to 5 exhibit excellent anti-seizure property.

(3) Fatigue Test

Here, Invention Specimen No. 1 and Comparative Specimen No. 11, and Invention Specimen No. 5 and Comparative Specimen No. 15 are compared with each other, respectively. Invention Specimen Nos. 1 and 5, each containing not less than 5 mass % of the element in a solid lubricant within a depth of 10 μm from the surface of the bearing alloy layer, are not inferior in fatigue resistance property as compared with Comparative Specimen Nos. 11 and 15 containing no solid lubricant.

Comparing Invention Specimen No. 2 with Comparative Specimen No. 12, the latter specimen having a surface roughness exceeding 5 μm is considerably inferior in fatigue resistance property than the former Invention Specimen No. 2.

Comparing Invention Specimen No. 4 with Comparative Specimen No. 14, the latter specimen, of which bearing alloy has a Vickers hardness (Hv) of less than 40, has a considerably lower hardness than the former Invention Specimen No. 4. The reason of this will be presumably because the bearing alloy of Comparative Specimen No. 14 has a Vickers hardness (Hv) of less than 40, namely it is too soft, whereby the fatigue resistance strength is deteriorated.

As will be apparent from the above, according to the invention plain bearing in which the bearing alloy has a Vickers hardness (Hv) of from not less than 40 to not more than 160, and which has the lubricative surface layer containing the solid lubricant containing the element having the maximum concentration of not less than 5 mass % within a depth of 10 μm from the surface of the bearing alloy layer, it is possible to reduce the coefficient of friction while maintaining the good fatigue resistance property and to improve the anti-seizure property.

The invention claimed is:

1. A plain bearing for internal combustion engines, which comprises a back metal layer and a bearing alloy layer made of an aluminum-base bearing alloy formed over the back metal layer, wherein the bearing alloy layer has a Vickers hardness (Hv) of from not less than 40 to not more than 160, and wherein the bearing alloy layer comprises a lubricative surfacial sub-layer containing a solid lubricant, which sub-layer is produced by shooting particles of the solid lubricant having a particle size of a most 10 μm, to collide against the surface of the bearing alloy layer, the sub-layer being a part of said bearing alloy layer and having a thickness of not more than 10 μm extending from the surface of the bearing alloy layer into the bearing alloy layer, wherein a concentration of an element contained in the solid lubricant decreases from the outermost part of the lubricative surfacial sub-layer toward the depth throughout the lubractive surfacial sub-layer, and the maximum concentration of such an element is not less than 5 mass % at the outermost part of the lubricative surfacial sub-layer, wherein the outermost part of the lubricative surfacial sub-layer of the bearing alloy layer has a surface roughness of not more than 3 μm in terms of the maximum height (Rz), and wherein there is provided a coating layer having a thickness of 0.01 to 10 μm on the bearing alloy layer, the coating layer consisting of a solid lubricant material.

2. The plain bearing of claim 1 wherein the thickness of said lubricative surfacial sub-layer is no more than 5 μm.

3. The plain bearing of claim 1 in place in an internal combustion engine, in mating relation to a rotatable mating shaft.

4. A plain bearing according to claim 1, wherein the solid lubricant is selected from the group consisting of molybdenum disulfide, graphite, tungsten disulfide, boron nitride, graphite fluoride and molybdenum trioxide.

5. A plain bearing according to claim 1, wherein the aluminum-base bearing alloy comprises 3 to 20 mass % Sn, and has Vickers hardness (Hv) of from not less than 40 to more than 80.

6. A plain bearing according to claim 1, wherein the aluminum-base bearing alloy comprises 4 to 12 mass % Si, and has Vickers hardness (Hv) of from not less than 80 to not more than 160.

7. A plain bearing according to claim 1, wherein the aluminum-base bearing alloy comprises 3 to 20 mass % Sn and 1.5 to 8 mass % Si, and has a Vickers hardness (Hv) from not less than 40 to not more than 80.

8. The plain bearing of claim 1 wherein the solid lubricant comprises more than one of substances selected from the group consisting of molybdenum disulfide, graphite, tungsten disulfide, boren nitride, graphite fluoride and molybdenum trioxide.

9. The plain bearing of claim 1 wherein the maximum concentration of the solid lubricant is not less than 15 mass % of the lubricative surfacial sub-layer.

* * * * *

UNITED STATES PATENT AND TRADEMARK OFFICE
CERTIFICATE OF CORRECTION

PATENT NO. : 7,771,120 B2
APPLICATION NO. : 11/059521
DATED : August 10, 2010
INVENTOR(S) : Kagohara et al.

Page 1 of 1

It is certified that error appears in the above-identified patent and that said Letters Patent is hereby corrected as shown below:

Title Page, item (73) Assignee, delete "Daido Metal Corporation, Ltd., Nagoya (JP)", and insert
--Daido Metal Company Ltd., Nagoya (JP)--.

Signed and Sealed this
Twenty-fourth Day of December, 2013

Margaret A. Focarino
*Commissioner for Patents of the United States Patent and Trademark Office*